(No Model.)

E. F. WALTER.
HANDSAW.

No. 563,521. Patented July 7, 1896.

Witnesses:
Andrew Stewart
Frank H. Brainard

Inventor:
Ernest F. Walter
per Charles Raettig
his Attorney.

UNITED STATES PATENT OFFICE.

ERNEST F. WALTER, OF HOBOKEN, NEW JERSEY.

HANDSAW.

SPECIFICATION forming part of Letters Patent No. 563,521, dated July 7, 1896.

Application filed January 29, 1896. Serial No. 577,257. (No model.)

*To all whom it may concern:*

Be it known that I, ERNEST F. WALTER, a citizen of the United States, and a resident of Hoboken, in the county of Hudson and State of New Jersey, have invented certain new and useful Improvements in Handsaws, of which the following is a specification.

This invention relates to improvements in handsaws, and more particularly to that class of handsaws which serve to cut into flooring or plates of sheet metal; and my invention consists in providing the lower edge of an ordinary handsaw, terminating at its outer end in a circular curve, with peculiarly shaped and set teeth to facilitate the smooth and quick operation in handling and cutting with such a tool.

Figure 1:
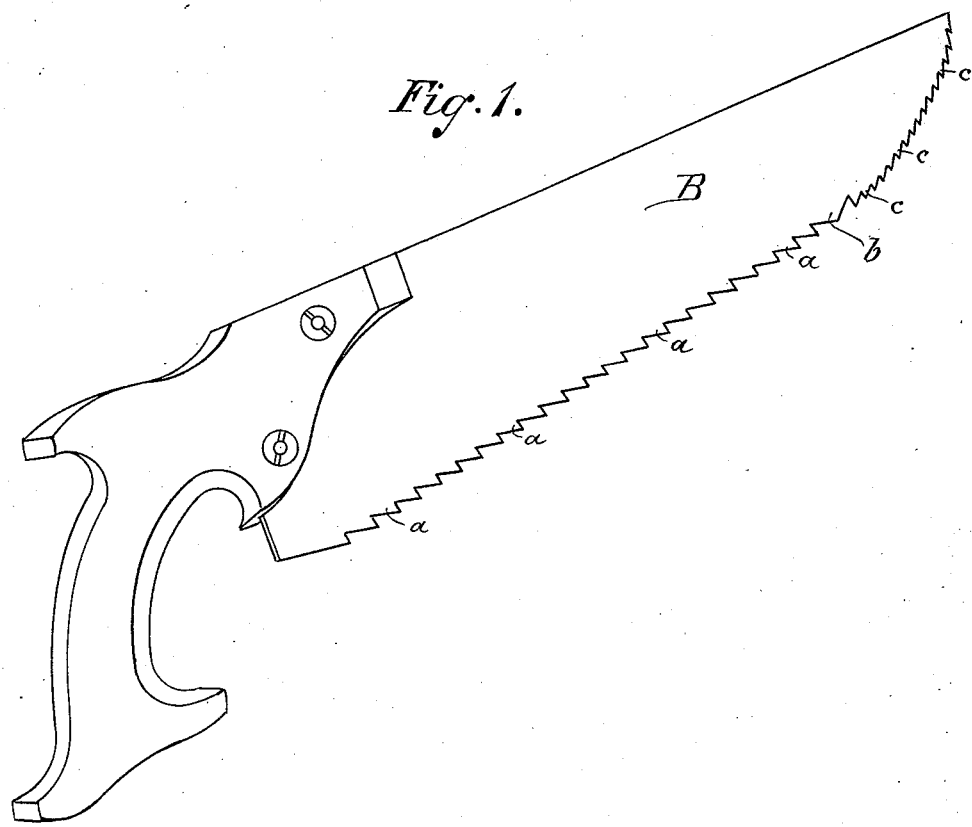
Figure 2:
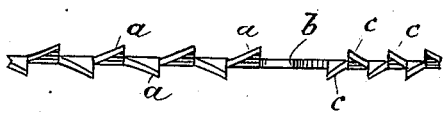

In the accompanying drawings, Figure 1 is a perspective view of a saw, showing my improvements. Fig. 2 is a bottom view, in a larger scale, of a portion of its blade near the point at which the straight portion of the lower edge strikes the end curve.

Similar letters designate similar parts in both views.

At the point at which the straight portion of the lower edge of the saw-blade B strikes the end curve $a$ a tooth $b$ is provided, the sides of which form an obtuse angle with each other, while right and left from this tooth the teeth $a$ and $c$ are cut preferably with their cutting edges standing at right angles to the lower edge of the saw-blade, while the slanting edges of the teeth $a$ and those of the teeth $c$ on the curve adjoining the tooth $b$ are preferably cut parallel to the corresponding edge of the tooth $b$.

The remaining number of teeth $c$ cut on the curved portion are cut of the same shape as those adjoining the tooth $b$, but follow the curve, their cutting edges being placed at right angles to the curve.

The teeth $c$ are made preferably smaller than the teeth $a$, and both are set more or less like the teeth of an ordinary saw, while the tooth $b$ is made straight, forming a continuation of the saw-blade, and extends to the line drawn through the outer edges of the teeth $a$.

In employing this saw for cutting into a wooden floor, the lower edge of the saw is preferably held in such a position that it will form an acute angle to the horizontal plane, and the line to be cut is slightly marked by the edges of the tooth $b$ and the adjoining teeth $c$ on the curved portion of the saw while pushing the blade of the saw away from the operator.

The saw being held with one hand, while with the other a gentle pressure is exerted upon the upper edge of the saw-blade, will then make its first cut while pulling it under pressure toward the operator along the line previously marked, the teeth $c$ on the curve coming into action during this movement, and the first entry having thus been effected the teeth $a$ standing nearest to the straight tooth $b$ will commence to cut while the saw is pushed forward, while the straight tooth $b$ will guide the blade in the groove previously formed.

By repeating the movement the teeth $a$ and $c$ will cut alternately and thus effect a speedy entrance through the floor.

One principal object in slanting the teeth $c$ in an opposite direction from the teeth $a$ is to prevent the saw from sudden stops and bending, which must follow when all the teeth on a saw-blade curved at its outer end slant in the same direction.

By making the teeth on the curve smaller than those on the straight edge, the defects of catching and jerking are almost entirely obviated.

This saw will be especially adapted to opening a pocket on top of one or more beams without injury to the beam, making it almost indispensable for plumbers and the like.

In the same manner, saw-blades for cutting sheet metal can be made and used, as heretofore described.

Having thus described my invention, what I claim, and desire to secure by Letters Patent, is—

In a handsaw having a blade curved at its outer lower edge, the combination of a straight tooth $b$ placed at the beginning of the curve of the blade with set teeth $a$ and $c$ slanting in opposite directions, as and for the purposes here shown and described.

Signed at New York, in the county of New York and State of New York, this 28th day of January, A. D. 1896.

ERNEST F. WALTER.

Witnesses:
  PHILIP J. RYAN,
  PETER ROGERS.